United States Patent [19]

Chichetti

[11] Patent Number: 5,715,952
[45] Date of Patent: Feb. 10, 1998

[54] PORTABLE AND REMOVABLE FISHING ROD HOLDING DEVICE

[76] Inventor: Richard Joseph Chichetti, 3810 Bobbin Mill Rd., Tallahassee, Fla. 32312

[21] Appl. No.: 641,741

[22] Filed: May 2, 1996

[51] Int. Cl.$^6$ .................................................. A47F 7/00
[52] U.S. Cl. .................... 211/70.8; 211/87; 224/922; 248/512; 248/206.3
[58] Field of Search ................. 211/70.8, 87, 65, 211/60.1; 224/922, 406, 566, 559; 248/206.3, 206.4, 512, 513

[56] References Cited

U.S. PATENT DOCUMENTS

| | | | |
|---|---|---|---|
| 2,302,300 | 11/1942 | Davies | 224/559 |
| 2,554,650 | 5/1951 | Waite | 211/70.8 X |
| 3,155,238 | 11/1964 | Bennett | 248/206.3 X |
| 4,073,462 | 2/1978 | Whitaker | 248/513 X |
| 4,157,803 | 6/1979 | Mack | 248/512 |
| 4,696,447 | 9/1987 | Strecker | 248/206.3 |
| 4,871,099 | 10/1989 | Bogar | 248/512 X |
| 5,222,707 | 6/1993 | Myers | 248/206.3 X |
| 5,435,473 | 7/1995 | Larkum | 211/70.8 X |

FOREIGN PATENT DOCUMENTS

| | | | |
|---|---|---|---|
| 212802 | 1/1961 | Austria | 248/206.3 |
| 149955 | 12/1931 | Switzerland | 248/206.4 |

*Primary Examiner*—Robert W. Gibson, Jr.
*Attorney, Agent, or Firm*—Carnes Cona and Dixon

[57] ABSTRACT

The present invention provides for a portable fishing rod holding device which is adapted to be removably secured to any smooth, non-porous surface. The fishing rod holding device of the present invention comprises a pair of horizontal supporting members, spaced in a parallel relationship. A plurality of vertically spaced and hollow tubular fishing rod holders are secured to the front surface of the supporting members. Secured to the back surface of the supporting members are a plurality of suction cups for enabling the device to be portable as well as attachable to and removable from any surface.

14 Claims, 2 Drawing Sheets

PORTABLE AND REMOVABLE FISHING ROD HOLDING DEVICE

BACKGROUND OF THE INVENTION

1. Field of the Invention

The present invention relates generally to a fishing rod holding device and more particularly to a fishing rod device which is adapted to be removably secured to any smooth, nonporous surface. The device of the present invention is ideally suited for, but not limited to, use within the interior of a boat.

2. Description of the Prior Art

Fishing has become a very popular and exciting sport. As a matter of providing convenience and safety in transporting or storing fishing rods, fishermen use fishing rod holding devices. These devices also allow the fisherman to use more than one rod at a time in order to increase the amount of fish caught and provide a means of relieving the fisherman from continuously holding the rod.

This conventional holding device consists of a holding receptacle that is adapted to receive the fishing rod. A bracket is used to secure this receptacle to the boat or optionally the receptacle is built into the gunwales of the boat. Conventional rod holders are permanently secured to the boat through the use of screws, brackets, or holes drilled or molded into the gunwales. These conventional devices suffer some drawbacks. One such drawback is the need to drill holes or make other modifications to facilitate the attachment of the holding devices to the boat. Another drawback is the lack of portability of the conventional devices in terms of the inability to move the device to another location as the fisherman's position demands without making further modifications to the boat. Conventional devices would require the installation of a plurality of brackets or the drilling of more apertures to accommodate screws to hold and maintain the device. Additionally, it is difficult to remove conventional holding devices when not in use.

Accordingly, efforts have been made to provide for rod holding devices which can hold a multiplicity of fishing rods while minimizing the damage or modifications to a boat. Such a device is disclosed in U.S. Pat. No. 4,157,803 issued to Mack. Mack discloses a device which includes a longitudinal body member. Secured to the longitudinal body member are a plurality of rod holders. The longitudinal body member is adapted to be secured from gunwale to gunwale for providing for the longitudinal body member to extend across the boat. Though successful at maintaining a plurality of rods, this device, once installed, provides difficult maneuvering and access on the boat. Additionally, for securing the fishing rod to the rod holder, wing nuts are utilized. These wing nuts can easily rust through or get lost to inherently render the device to be nonfunctional. Further still, to adapt the device to various size and style boats, there is included an extension bar. This extension bar does enable further utility of the device while adding more complexity. This extension bar will also add to the time for installing and utilizing the device. Also, the device is limited in its use due to the need for somewhat parallel gunwales to be present for its attachment.

Accordingly, none of these previous efforts provide the benefits intended with the present invention, such as providing a fishing rod device which is easy to use and install as well as enable a plurality of fishing rods to be secured thereto. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a fishing rod holding device which is adapted to be removably secured to any smooth nonporous surface. In particular, the present invention can be removably secured onto any size, type or style of boat, vehicle, or wall.

The present invention comprises a supporting members having a plurality of rod holding receptacles attached thereto. The supporting members comprises a pair of longitudinal rods disposed in a parallel relationship. These longitudinal rods include a front surface and a back surface. The front surface maintains the rod holding receptacles while the back surface includes an attaching means.

The holding rod receptacles comprises a tubular member having an opened top and an opened bottom for receiving the conventional fishing rod. A slot extends partially downward on the front surface of the holding rod receptacle. This will provide for the slot to receive the reel of the conventional fishing rod and for the termination of the slot to provide for a natural stop for the reel. Thereby, rending the conventional rod to be in a fixed position in the holding receptacle.

The attaching means enables the device to be quickly and efficiently removably secured to any surface, such as the interior of a boat. The attaching means includes a plurality of suction cups. The use of suction cups will provide for a secure attachment while not causing damage to the boat.

In yet another embodiment, the supporting members of the present invention can be altered to accommodate any curvature which may exist in the smooth, nonporous surface, such as the interior of a boat. This alteration consists of reconfiguring the supporting members. The supporting members would include at least one pivotal member located between two adjacent rod holders for enabling the supporting members to adjust and conform to any particular surface.

Accordingly, it is the object of the present invention to provide for a rod holder device which will overcome the deficiencies, drawbacks, and shortcomings of prior fishing rod holders.

Still a further object of the present invention is to provide for a rod holder device which will successfully maintain a plurality of fishing rods and which is adapted to be removably secured to any particular surface.

Another object of the present invention, to be specifically enumerated herein, is to provide a fishing rod holding device in accordance with the preceding objects and which will conform to conventional forms of manufacture, be of simple construction and easy to use so as to provide a device that would be economically feasible, long lasting and relatively trouble free in operation.

Although there have been a few inventions related to a fishing rod holding device, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The present invention provides for an extremely versatile device in terms of its ability to attach quickly and without prior preparation to any smooth nonporous surface. Additionally, it can be removed from the boat and placed on a different boat or vehicle as the user desires. It also could be used to store fishing rods in virtually any location where its attachment mechanism could adhere. The design also lends itself to almost unlimited variation in the number or rod receptacles used.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
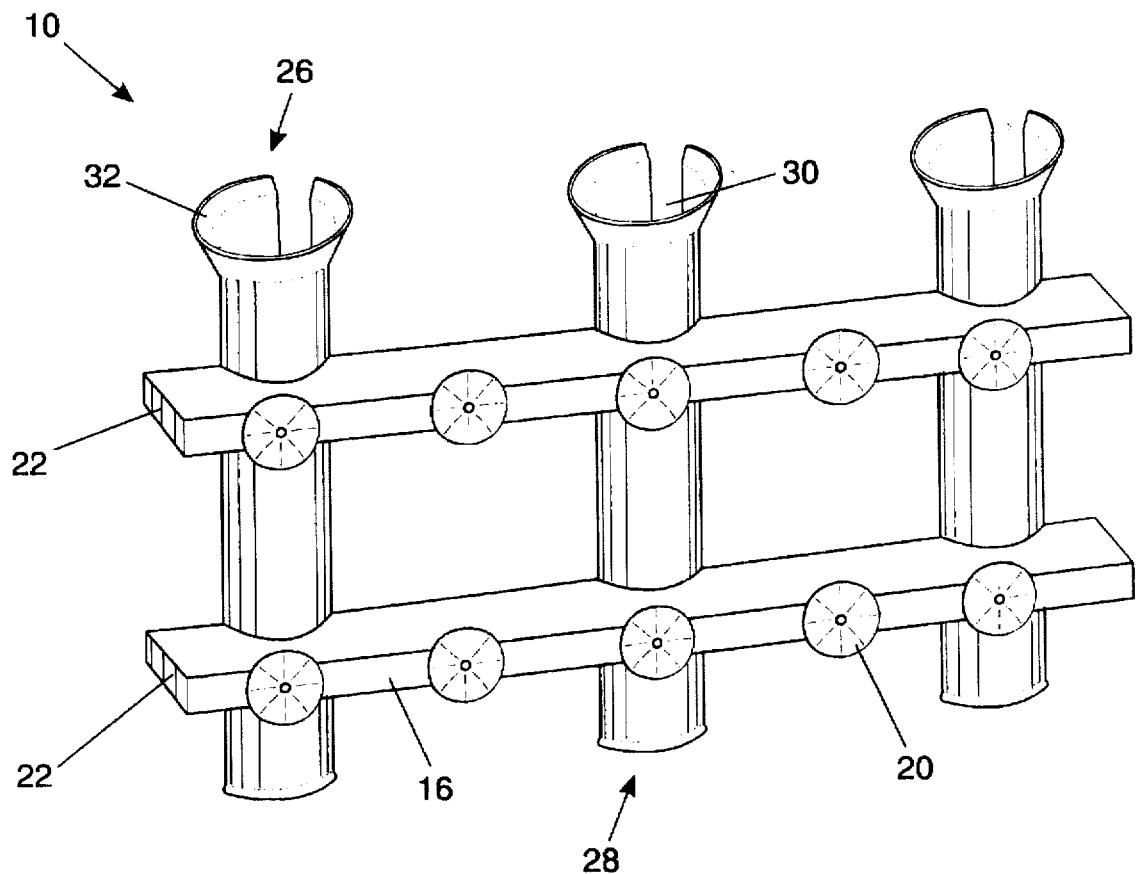
FIG. 1 is a back perspective view of the fishing rod holding device of the present invention.
Figure 2:
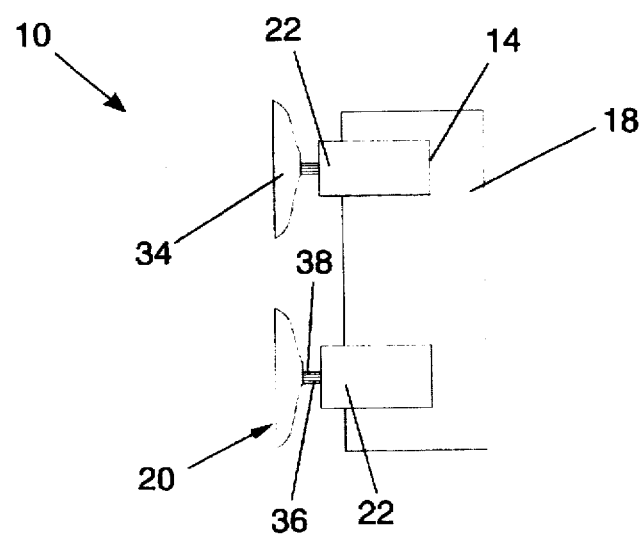
FIG. 2 is a side planar view of the fishing rod holding device of the present invention.
Figure 3:
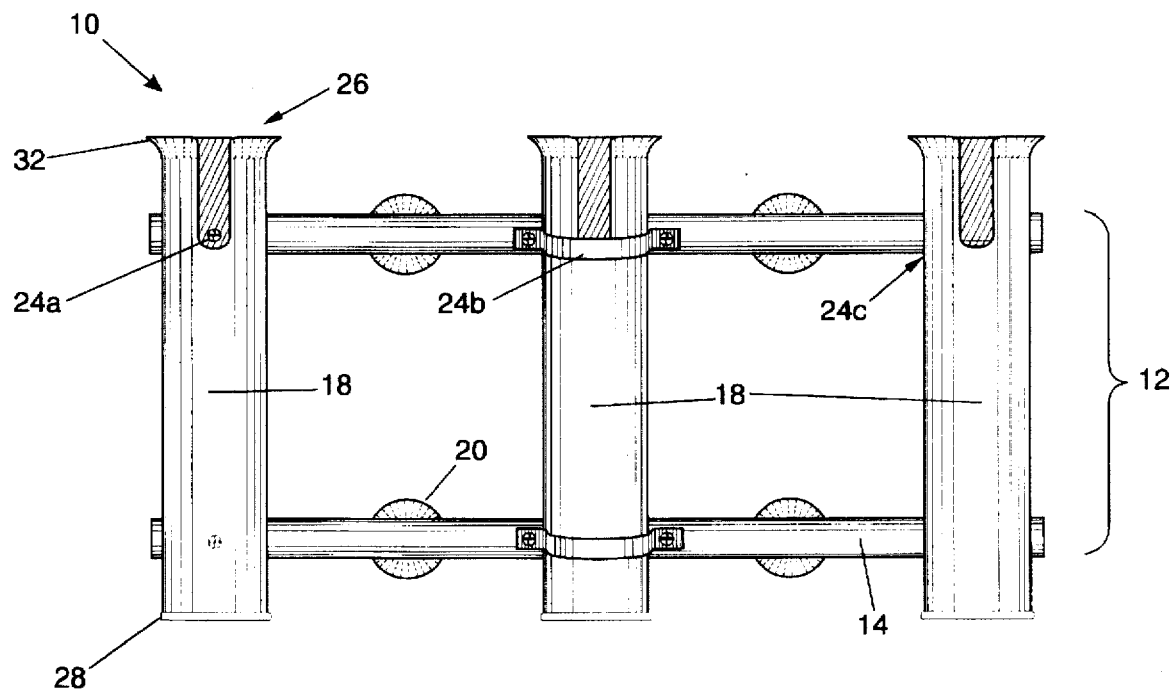
FIG. 3 is a front planar view of the fishing rod holding device of the present invention.

As illustrated in FIGS. 1–3, the fishing rod device 10 of the present invention is comprised of a supporting means 12 having a front surface 14 and a back surface 16. The front surface 14 maintains a plurality of fishing rod holding receptacle 18 while the back surface includes an attaching means 20 for attaching the device to any surface, such as the interior of a boat, a wall within a storage facility or the like.

The supporting means 12 comprises two longitudinal members 22, horizontally spaced apart. The front 14 of each member 22 maintains the back surface of the fishing rod holding receptacle 18 via a securing means. This securing means can be any conventional securing means, such as screws 24a, brackets 24b, adhesives 24c, or the like for providing for the fishing rod holding receptacle 18 to be affixed securely to the supporting means 12. Optionally, the longitudinal members 22 and holding receptacles 18 can be an integral structure.

The longitudinal members 22 of the supporting means can accept the fishing rod holding receptacles 18 via a groove (not labeled), as illustrated in these figures or optionally, the holding receptacles can abut the front surface 14 of the supporting means, eliminating the use of grooves.

Additionally, it is noted that the supporting members 22 can be any shape or configuration, such as, but not limited to having a circular cross section, square cross section, oval cross section or the like.

Each fishing rod holding receptacle 18 are hollow tubular members which further includes an open top 26 and an open bottom 28 for enabling the conventional fishing rod to extend therethrough. The front of the fishing rod holding receptacle 18 includes a slot 30 that extends downwardly from the open top 26. The slot is for receiving a conventional reel of a fishing rod. As seen in the figures, the slot 30 is preferably formed by downwardly and inwardly tapered sides and includes a curved bottom which terminates the formation of the slot. This tapering provides a guiding means for guiding the reel into the slot while the bottom of the slot acts as a natural stop for the reel. The design and configuration of the slot will enable the reel and conventional fishing rod to be in a fixed and secured position within the fishing rod holding receptacle 18.

The open top 26 of fishing rod holding receptacle 18 includes tapered ends 32. The tapering extends downwardly and inwardly from the top and renders a means for the user to adjust and position the fishing rod within the holder 18.

The back surface 16 of the supporting means 12 includes a plurality of attaching means 20 for enabling the device to be removably secured to any smooth and nonporous surface. The attaching means comprises a plurality of suction cups 34 secured to the back surface 16 of the supporting means via a shaft 36. For providing more structural integrity to the attaching means 20, the shaft may include a protecting cover or furrow 38.

The use of suction cups for the attaching means provides a device which does not require prior preparations for attachment to a particular surface. The device of the present invention is portable and versatile due to the use of the attaching means. Additionally, the attaching means of the present invention provides a device which is not only easy to use and install, but also will not damage the particular surface while still enabling a plurality of conventional fishing rods to be maintained.

Accordingly, to utilize the device 10 of the present invention, the user may optionally clean the surface where the attachment will occur. Once cleaned, the back end of the device is pressed against the surface. As the user pushes the front of the device of the present invention towards the surface, the suction cups of the securing means pushes air outward. Due to the natural elasticity of the suction cup, it will try to retract and will inherently cause a vacuum to exist between the surface and the interior of the suction cup. Simultaneously, air will press against the exterior of the cup. This will provide for the attaching means to engage and be secured to the desired surface. This will provide for the device to be in a hung and secured position. Once hung, the user may insert the fishing rod into the fishing rod holding receptacles such that the reel extends through the slot of the holding receptacle. This will provide for the fishing rod to be in a secured and fixed position within the receptacle and enable the user to use the device of the present invention.

The fishing rod holding device of the present invention is ideal for use within the interior of a fishing boat or secured to a wall of a storage facility. Since all boats and walls are not configured identically and many do not have an interior surface which is flat, the present invention is provided with a conforming means which will render a device which can conform and be removably secured to any surface. This conforming means is illustrated in further detail in FIG. 4.

Figure 4:
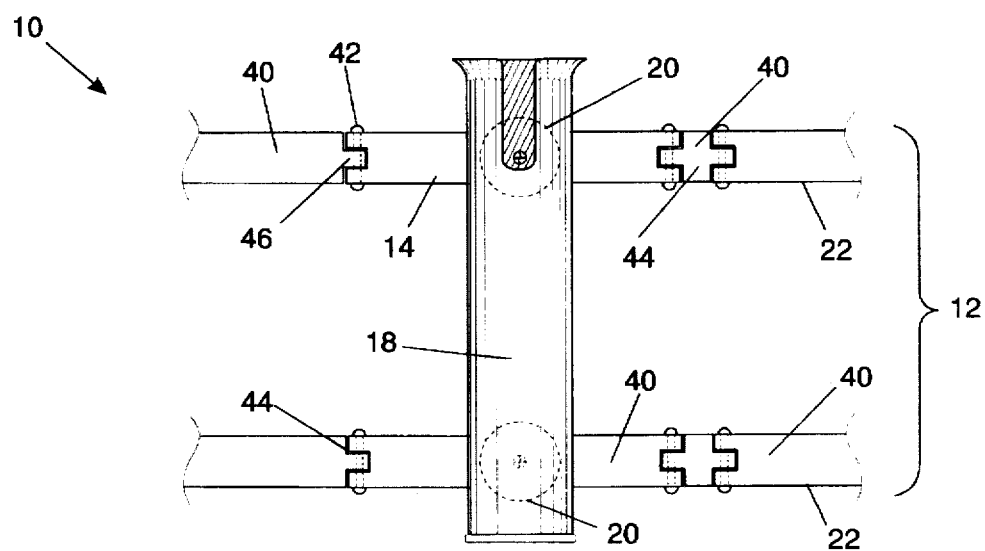
FIG. 4 is a front planar view of an alternative embodiment for the supporting members used in the fishing rod holding device of the present invention.

As seen in FIG. 4, the fishing rod holding device 10 includes a conforming means comprising a plurality of sections 40 which form each longitudinal member 22. The sections 40 are interlock with one another at an interlocking section 44. This interlocking section 44 includes a portion of a preceding section and a subsequent section. Extending through and securing the preceding section and subsequent section is a pin 42. This pin extends through a through hole 46 which extends through the interlocking section 44. This design and configuration of each interlocking section 44 and pin 42 provides for the preceding section to be pivotally secured to the subsequent section for rendering the supporting means 12 to be flexible and conformable.

These interlocking sections 44 are located between two holding receptacles 18. For more flexibility there can be a plurality of interlocking sections 44 between the two holding receptacles 18, and for less flexibility there can be just one interlocking section 44 located between the two holding receptacles 18.

The utilization of this reconfigured apparatus operates in the same manner as discussed and illustrated in FIGS. 1–3.

The various components, such as the holding receptacle and supporting means, can be formed as integral components or as separate components. The material used for the holding receptacles, supporting means, and attaching means can be any durable anti-rusting material, such as, but not limited to polyvinyl, polymer, or the like.

While the invention has been particularly shown and described with reference to an embodiment thereof, it will be understood by those skilled in the art that various changes in form and detail may be made without departing from the spirit and scope of the invention.

I claim:

1. A portable and removable fishing rod holding device comprising:

a supporting means having a front and a back;

a plurality of hollow tubular members which each are adapted to receive a conventional fishing rod;

said plurality of hollow tubular members are secured to said front of said supporting means;

an attaching means is secured to said back of said supporting means and said attaching means comprising a plurality of suction cups for enabling easy and quick removal of said supporting means to any smooth, non-porous surface;

said supporting means comprises a pair of longitudinal members which are vertically spaced apart, and said hollow tubular members are vertically aligned with respect to said supporting means; and each longitudinal member includes a plurality of sections, and a preceding section is pivotally secured to a subsequent section for providing for said longitudinal members to be conforming to any surface.

2. A portable and removable fishing rod holding device as in claim 1 wherein said front of each longitudinal member further includes a plurality of grooves for accepting and receiving said hollow tubular members.

3. A portable and removable fishing rod holding device as in claim 1 wherein hollow tubular members each include an open top, an open bottom and a slot which extends downwardly from said open top, said slot includes a curved bottom which terminates the formation of said slot, and said slot is frontwardly located and is adapted to receive a reel of said conventional fishing rod.

4. A portable and removable fishing rod holding device as in claim 3 wherein said slot further includes a top end having tapered ends which taper inwardly from said open top.

5. A portable and removable fishing rod holding device as in claim 3 wherein said open top of said hollow tubular member include tapered ends, said tapered ends tapered downwardly and inwardly from said open top for enabling a means for a user to adjust and position said conventional fishing rod within said hollow tubular member.

6. A portable and removable fishing rod holding device as in claim 1 wherein said attaching means further includes a plurality of shafts extending outwardly from said back of said supporting means for providing each of said plurality of shafts to be sandwiched between said supporting means and a suction cup.

7. A portable and removable fishing rod holding device as in claim 6 wherein each of said shafts includes a protective covering.

8. A portable and removable fishing rod holding device comprising:

a supporting means having a front and a back;

a plurality of hollow tubular members which each are adapted to receive a conventional fishing rod;

said plurality of hollow tubular members are secured to said front of said supporting means;

said supporting means further includes a conforming means for enabling said supporting means to be conforming to any surface;

said conforming means of said supporting means comprises a plurality of sections, and a preceding section is pivotally secured to a subsequent section for providing for said supporting means to be conforming to said surface; and an attaching means is secured to said back of said supporting means for enabling said device to be removably secured to a nonporous surface.

9. A portable and removable fishing rod device as in claims 8 wherein said attaching means includes a plurality of suction cups.

10. A portable and removable fishing rod holding device as in claim 8 wherein hollow tubular members each include an open top, an open bottom and a slot which extends downwardly from said open top, said slot includes a curved bottom which terminates the formation of said slot, and said slot is frontwardly located and is adapted to receive a reel of said conventional fishing rod.

11. A portable and removable fishing rod holding device as in claim 10 wherein said slot further includes a top end having tapered ends which taper inwardly from said open top.

12. A portable and removable fishing rod holding device as in claim 10 wherein said open top of said hollow tubular member include tapered ends, said tapered ends tapered downwardly and inwardly from said open top for enabling a means for a user to adjust and position said conventional fishing rod within said hollow tubular member.

13. A portable and removable fishing rod holding device as in claim 8 wherein said attaching means further includes a plurality of shafts extending outwardly from said back of said supporting means for providing each of said plurality of shafts to be sandwiched between said supporting means and a suction cup.

14. A portable and removable fishing rod holding device as in claim 13 wherein each of said shafts includes a protective covering.

* * * * *